Feb. 17, 1925

H. C. TRYON

PISTON

Filed Dec. 29, 1922

1,526,883

INVENTOR
H. C. Tryon,
BY Watson, Coit, Morse & Grindle
Attys.

Patented Feb. 17, 1925.

1,526,883

UNITED STATES PATENT OFFICE.

HENRY CHRISTOPHER TRYON, OF LONDON, ENGLAND, ASSIGNOR TO D. NAPIER & SON LIMITED, OF LONDON, ENGLAND, A BRITISH COMPANY.

PISTON.

Application filed December 29, 1922. Serial No. 609,740.

*To all whom it may concern:*

Be it known that I, HENRY CHRISTOPHER TRYON, subject of the King of England, residing at London, in England, have invented certain new and useful Improvements in Pistons, of which the following is a specification.

This invention relates to pistons for internal combustion engines of the kind in which a circumferential gap is formed between the head and body portions which are formed integral, being connected together by means of a truncated conical member having its largest diameter secured to the inner wall of the body. The object of this invention is to provide a piston of this type in which the expansion of the skirt or body portion is controlled so as to prevent slap.

According to this invention the piston is formed of aluminium or aluminium alloy and not only is the heat conducted away from the head to the skirt approximately midway in its length, by means of a truncated conical member, but in addition, the skirt is slit longitudinally and provided, at the junction between the inner wall of the skirt and the truncated conical member, with a complete or undivided ring formed of a metal having a coefficient of expansion which differs from that of the skirt metal and maintains constant the necessary clearance between the skirt and cylinder wall.

Preferably the ring is formed of a metal having a coefficient of expansion substantially corresponding with the expansion of the cylinder or cylinder liner and in addition to such a ring at the junction between the skirt and the conical member a similar ring may be secured to the skirt at its outer end.

In the accompanying drawings which show a piston constructed in accordance with this invention,—

Figure 1:
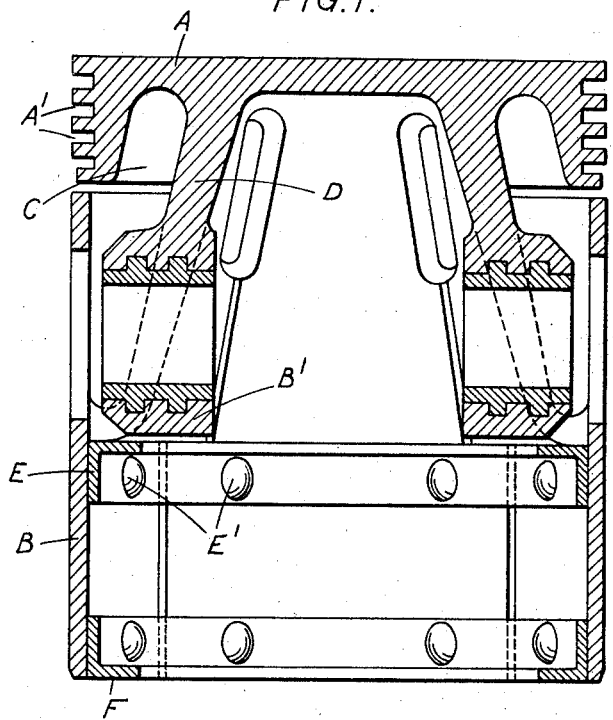
Figure 1 is a vertical section.
Figure 2:
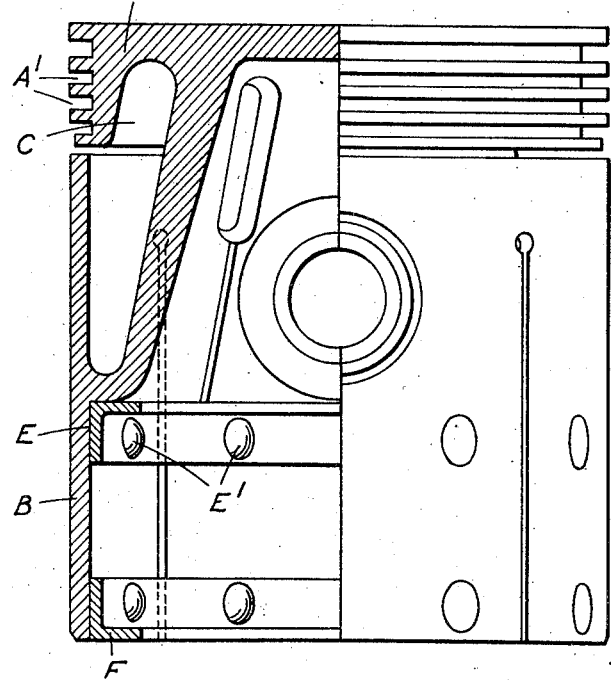
Figure 2 is an elevation partly in section in a plane at right angles to the section illustrated in Figure 1.

In the construction illustrated the piston comprises a head or crown portion A and a body or skirt portion B. The head is preferably grooved as at A' to receive piston rings and a gap or chamber C is formed between the head and the body portions to allow the head to expand independently of the body or skirt. The skirt is provided with bosses B' to receive the gudgeon pin and the head is connected to the body by means of a truncated conical member D cast integral with the head and body, the larger end of the conical member being connected to the skirt or body portion on a line approximately midway of the length of the skirt.

The piston above described is formed of aluminium or aluminium alloy and the heat of the heat portion A is conducted away from the head by means of the conical member D and transferred to the skirt approximately midway in the length of the latter.

The skirt is provided with a suitable number of longitudinal slits and at the junction between the base of the conical member D and the inner wall of the skirt B a ring E of angle section preferably formed of iron, steel or like metal having substantially the same coefficient of expansion as the cylinder or cylinder liner, is secured for example by means of rivets E'.

This ring controls the expansion of the skirt where the heat of the piston head is transmitted to the skirt and further controls the expansion of the skirt midway in the length of the latter.

If desired in addition to the main controlling ring E approximately midway in the length of the skirt, an additional controlling ring F similar to the ring E may be provided secured to the inner wall of the skirt at the lower edge thereof, the action of the second ring being similar to that of the main ring and further serving to prevent slap.

What I claim as my invention and desire to secure by Letters Patent is:—

1. In a piston for an internal combustion engine the combination of a head portion, a truncated conical member formed integral thereon, a skirt portion having longitudinal slits extending to the edge thereof formed integral with the conical member and connected approximately midway in its length to the larger end of said conical member, an undivided ring secured to the skirt at the junction between the skirt and conical member a second similar ring secured to the lower end of the skirt both rings being formed of a metal having a different coefficient of expansion from that of the metal of which the piston is formed.

2. In a piston for an internal combustion engine the combination of a head portion, a truncated conical member formed integral thereon, a skirt portion having longitudinal slits extending to the edge thereof formed integral with the conical member and connected approximately midway in its length to the larger end of said conical member and an undivided ring secured to the skirt at the junction between the skirt and conical member said ring being formed of a metal having the same coefficient of expansion as the cylinder.

In testimony whereof I have signed my name to this specification.

HENRY CHRISTOPHER TRYON.